Oct. 6, 1936.　　A. D. ROBBINS ET AL　　2,056,367
GEAR SHIFT LOCK
Filed May 25, 1934　　2 Sheets-Sheet 1
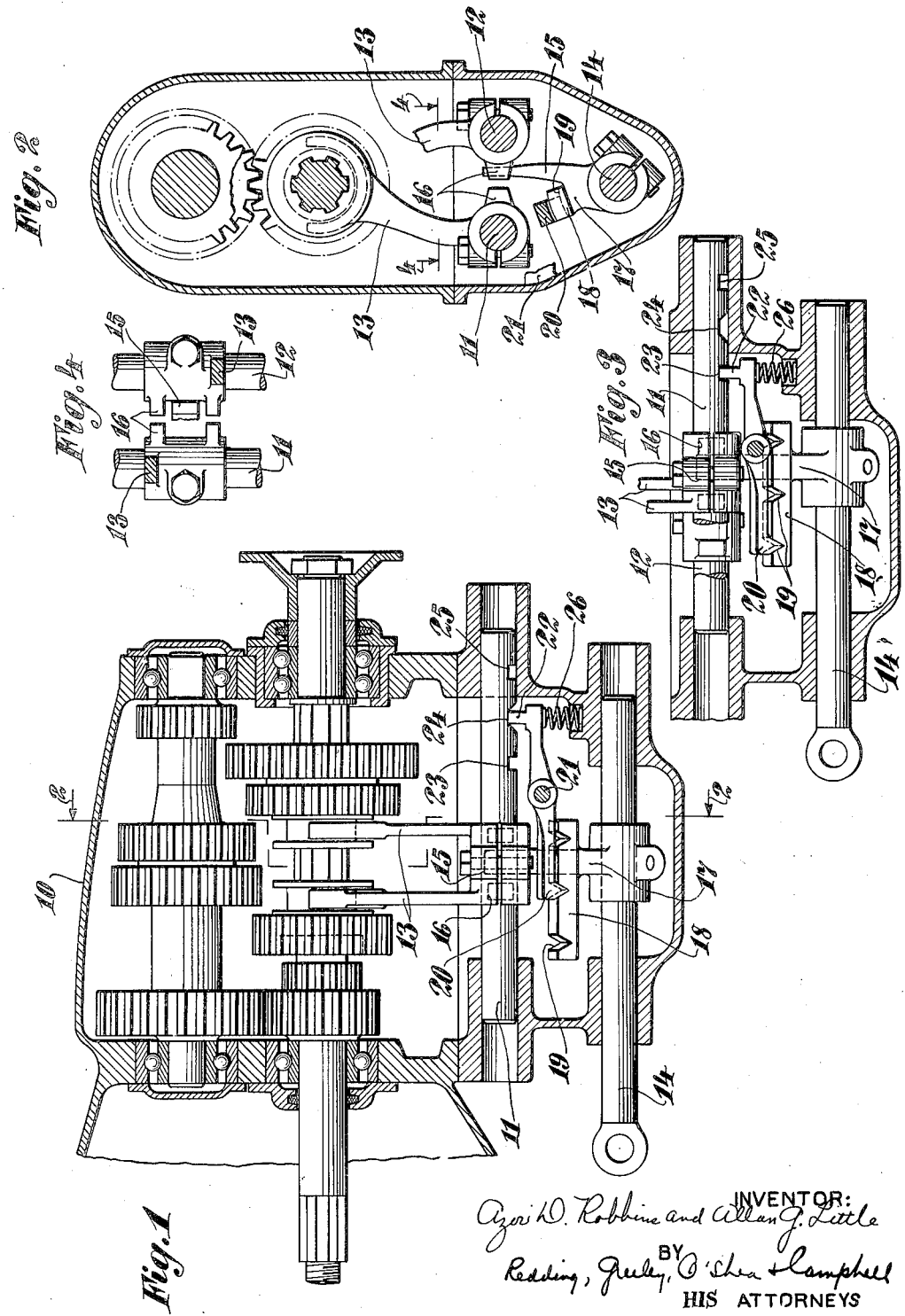

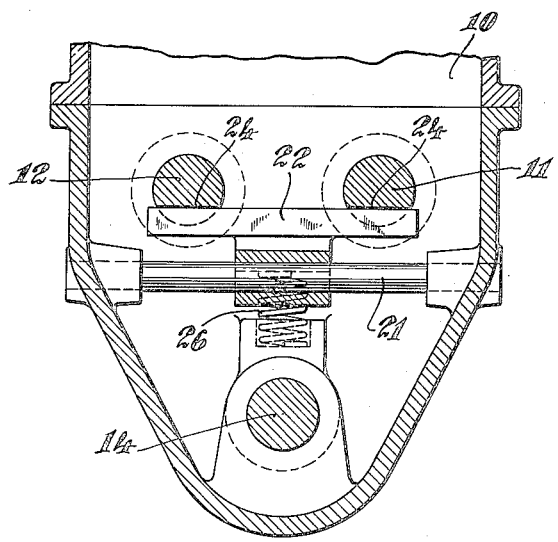

Patented Oct. 6, 1936

2,056,367

UNITED STATES PATENT OFFICE 2,056,367

GEAR SHIFT LOCK

Azor D. Robbins, Highland Park, N. J., and Allan G. Little, Brooklyn, N. Y., assignors to International Motor Company, New York, N. Y., a corporation of Delaware Application May 25, 1934, Serial No. 727,400

4 Claims. (Cl. 74—477)

The present invention relates to locks for gear shifting mechanisms and embodies, more specifically, an improved gear shift lock by means of which the gears of a gear shift mechanism may be positively locked in predetermined positions, thus preventing the gears from sliding out of mesh. The structure is of such character as to render the shifting operations more easily accomplished inasmuch as the friction against the shifter shafts is practically eliminated.

In certain forms of gear shifting mechanisms, it is well known that shifting operations are frequently difficult to effect because of the friction which is normally exerted against the shifter shafts and associated mechanism to prevent the gears from sliding out of engagement during operation. In existing gear shift mechanisms, it has been common to provide spring-pressed detents which directly engage the shifter shafts and are adapted to slide into recesses formed in the shafts when the gears are in driving engagement. As stated above, these detents interfere with the free shifting of the gears. Moreover, the detents are sometimes inadequate to hold the gears in mesh.

In order to afford a transmission mechanism wherein the gears are positively locked in engaging position, the present invention has been designed and an object thereof is to provide a transmission mechanism wherein the gears are positively locked in engaging position.

A further object of the invention is to provide a mechanism of the above character wherein the locking means does not exert a normal frictional force upon any of the shifter shafts or shifting mechanism.

Further objects, not specifically enumerated above, will be apparent as the invention is described in greater detail in connection with the accompanying drawings, wherein:

Figure 1 is a view in section, taken through the axis of a transmission mechanism constructed in accordance with the present invention.

Figure 2 is a view in section, taken on line 2—2 of Figure 1, and looking in the direction of the arrows.

Figure 3 is a partial view similar to Figure 1 showing the relationship of the elements of the invention when the transmission has been moved to a gear connection other than the normal neutral position thereof.

Figure 4 is a view in section, taken on line 4—4 of Figure 2, and looking in the direction of the arrows.

Figure 5 is a view in section, taken on line 5—5 of Figure 1 and looking in the direction of the arrows.

Referring to the above drawings, a transmission housing is shown at 10 and is provided with the usual gears and shafts which need not be described in detail herein. A plurality of shifter shafts 11 and 12 are provided with shifter fingers 13 which are adapted to engage selected gears of the transmission in order to effect suitable shifting thereof.

In order that the shifter shafts may be moved axially a selector shaft 14 is provided in the housing, this shaft being slidable axially and mounted rotatably in a well known manner. A selector finger 15 is secured rigidly to the selector shaft 14 and is adapted to engage between spaced fingers 16 upon the fingers 13 in order that axial shifting of the shafts 11 and 12 may be effected.

Upon the finger 15 is formed a shoulder 17 upon which a plate 18 is fixedly secured. Spaced notches 19 are formed in the plate 18 and are adapted to be engaged by a detent 20 which is pivoted at 21 and is formed with a locking finger 22 which extends across both shafts 11 and 12 is adapted to engage notches 23, 24, and 25 formed in the shafts 11 and 12. Notches 23 and 25 are of rectangular section in order that the shafts may be locked positively in the positions thereof wherein gear connections are established. Notches 24 preferably are formed with sloping sides inasmuch as the locking finger 22 only engages this slot when the gear shifting mechanism is in neutral position.

It will be seen that axial movement of the selector shaft 14 causes the detent 20 to be elevated from a notch 19 in the plate 18 and thus cause the locking finger to be withdrawn from the notches 23, 24, and 25. A spring 26 may be provided to urge the locking finger normally against the shafts 11 and 12 and, in order that the initial movement of the selector shaft 14 may effect the disengagement of the locking finger 22 from the notches in the shafts 11 and 12, the fingers 16 are spaced from the finger 15 to afford sufficient back lash in order that the necessary amount of axial movement of the selector shaft may take place to disengage the locking finger 22 before an actual shifting operation is effected.

From the foregoing, it will be seen that a locking mechanism has been provided which positively locks the gears of the transmission mechanism in any connected position without exerting substantial friction upon the shifting mechanism. The strength of spring 26 need only be sufficient to urge the finger against the shafts 11 and 12 in order that it may engage the recesses thereof, axial movement of these shafts being positively resisted by the abutment of the sides of the recesses 23 and 25 against the sides of the finger 22. In this fashion, a simple and effective locking mechanism is provided by means of which shifting operations may be facilitated without impairing the effectiveness of the locking mechanism.

While the invention has been described with specific reference to the accompanying drawings, it is not to be limited, save as defined in the appended claims.

We claim as our invention:

1. In combination with a transmission having an axially slidable selector shaft formed with a selector finger, a shifter shaft parallel with the selector shaft and formed with spaced fingers adapted to be engaged by the selector finger with a degree of lost motion, said shifter shaft being formed with a notch having squared shoulders, a locking finger on the transmission adapted to engage the notch, and means actuated by the selector shaft and finger to release the locking finger from the notch during lost motion between the finger and the shifter shaft.

2. In combination with an axially slidable selector shaft formed with a selector finger, a shifter shaft formed with spaced fingers adapted to be engaged by the selector finger with a degree of lost motion, said shifter shaft being formed with a plurality of spaced notches having squared shoulders, and an intermediate notch having sloping sides, the first notches corresponding to gear engaging positions of the transmission and the intermediate notch corresponding to the neutral position of the transmission, a locking finger on the transmission adapted to engage the recesses, and means actuated by the selector shaft and finger to engage the locking finger and release the same from the recesses.

3. In combination with a transmission having a selector shaft formed with a selector finger, a shifter shaft formed with spaced fingers adapted to be engaged by the selector finger with a degree of lost motion, said shifter shaft being formed with a plurality of spaced notches having squared shoulders, a locking finger on the transmission adapted to engage the recesses, a recessed plate movable with the selector shaft, and a pivoted detent adapted to engage the recesses of the last named plate, the locking finger being mounted upon the other end of the pivoted detent.

4. In combination with a transmission having an axially slidable selector shaft formed with a selector finger, a shifter shaft parallel with the selector shaft and formed with spaced fingers adapted to be engaged by the selector finger with a degree of lost motion, said shifter shaft being formed with a notch having squared shoulders, a locking finger pivoted on the transmission and adapted to engage the notch, a detent on the locking finger, and means on the selector shaft to engage the detent and release the said locking finger during lost motion between the finger and the shifter shaft.

AZOR D. ROBBINS.
ALLAN G. LITTLE.